(12) United States Patent
Shoji

(10) Patent No.: US 8,614,825 B2
(45) Date of Patent: Dec. 24, 2013

(54) IMAGE PRINTING APPARATUS, IMAGE PRINTING METHOD, AND STORAGE MEDIUM

(75) Inventor: Atsushi Shoji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 13/087,873

(22) Filed: Apr. 15, 2011

(65) Prior Publication Data

US 2011/0286011 A1    Nov. 24, 2011

(30) Foreign Application Priority Data

May 19, 2010    (JP) ................... 2010-115333

(51) Int. Cl.
*G06F 3/12*    (2006.01)
*G06F 1/00*    (2006.01)
*G06K 9/00*    (2006.01)

(52) U.S. Cl.
USPC .......................... 358/1.2; 358/1.9; 382/167

(58) Field of Classification Search
USPC ................................ 358/1.1–1.18
See application file for complete search history.

(56) References Cited

U.S. PATENT DOCUMENTS

2005/0117174 A1\* 6/2005 Muratani ..................... 358/1.13
2006/0072939 A1\* 4/2006 Kremer et al. ............... 399/130
2010/0225932 A1\* 9/2010 Kurose et al. ................. 358/1.1

FOREIGN PATENT DOCUMENTS

JP    61-206065    9/1986

\* cited by examiner

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

A risk of a disadvantage was caused where the entire face of an image subjected to an interpolation or thinning processing causes an increased boundary length between a region including pixels (printing region) and a region not including pixels (paper background region) or causes a broken texture in the image. To prevent this, a transition area is provided in the image so that only the transition area can be subjected to an interpolation or thinning processing.

10 Claims, 14 Drawing Sheets

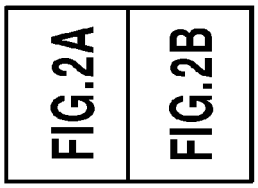

IMAGE PRINTING APPARATUS, IMAGE PRINTING METHOD, AND STORAGE MEDIUM

BACKGROUND OF THE INVENTION

1. Field of the Invention

The present invention relates to the minute expansion/reduction processing of an image.

2. Description of the Related Art

For image printing apparatuses (printers), there are various printing methods. For example, in the case of an electrophotographic method for fixing toner to a recording medium (e.g., paper) by heat and a pressure, the paper subjected to the heat and pressure undesirably extends or shrinks slightly. The extension of the paper also causes a proportional extension of a printed image. Such an extension of the paper is most remarkably found in the first fixing. Thus, a paper subjected to a double-side printing causes a slight difference in size between the image printed on the front side by the first fixing and the image printed on the back side by the second fixing. Such a slight size difference must be corrected in the field where the printing accuracy is important.

Various means have been known to correct such a difference in the image size caused by the extension of the paper.

For example, in the case of the above-described electrophotographic method, a polygon mirror is rotated to scan laser light. Thus, the extension in the main scanning direction of drawn laser can be corrected by adjusting the oscillation frequency of the pixel clock. The extension in the vertical scanning direction (sub scanning direction) on the other hand can be corrected by changing the rotating speed of the polygon mirror to thereby change the scan density.

In this case, in order to draw the respective pixels on a photoconductive drum correctly and uniformly, the rotation of the polygon mirror must be accurate and stable. When an approach is used to cope with the extension in the sub scanning direction during the double-side printing by changing the rotating speed of the polygon mirror after the printing of a front side of a paper, a fixed time interval is required until the rotating speed is stable. Thus, a declined printing performance is caused by the correction of the extension in the sub scanning direction by the adjustment of the rotating speed of the polygon mirror. Therefore, the correction of the extension in the sub scanning direction by the change of the rotating speed of the polygon mirror is not desired in such an image printing apparatus that is required to continuously maintain a high-speed printing.

In addition to the method for adjusting the drawing density by the printing mechanism-side as described above, there is another method to adjust the image data itself depending on the extension of the paper. Specifically, this is a method to thin out pixels to reduce the image size or to interpolate (or insert) pixels to expand the image size. For example, in the case of image data having 1000×1000 pixels in the main scanning direction and 1000×1000 pixels in the sub scanning direction respectively, the pixels are thinned out to 1000×990 or pixels are interpolated (or inserted) to convert the data to image data of 1000×1010 pixels. As described above, by generating new image data subjected to expansion/reduction so as to compensate the extension of the image undesirably caused during the printing of the front side, images having the same size in appearance can be printed on both sides of the paper.

The method as described above to correct the image data itself depending on the extension of the paper is desirable in the point that the printing mechanism is prevented from having a deteriorated performance. In the case where multivalued image data is subjected to a correction processing for performing an interpolation processing such as a linear interpolation to expand or reduce the image to output the image through a multiple tone apparatus (e.g., display), it is difficult to visually confirm the deterioration of the image due to the correct.

However, in the case where the corrected image data is outputted as a printed matter on a paper, the deterioration of the image can be undesirably visually recognized because the image data is converted from multivalued image data to binary image data and pixel values subjected to the interpolation or thinning are also binary.

The dots occur periodically by performing dither processing etc. to multivalued image data. The texture is generated by these periodic dots in binary image data. The texture of binary image data is more influenced by the interpolation or thinning of a pixel column than in the case of multivalued image data. Thus, when the same coordinates are subjected to interpolation or thinning in a longitudinal or lateral direction, this is easily recognized as a change in the concentration. Furthermore, when the coordinates of a pixel column to be subjected to interpolation or thinning are identical with the coordinates of a fine line of the texture, a phenomenon is undesirably caused where the pixel width is reduced by one pixel and the fine line changes into a thick line or disappears. Furthermore, when a change is caused in the size of the textures such as halftone dots changes arranged on a single line, this is undesirably recognized as a change in the concentration. To prevent this, in a processing for correcting binary image data, a method as disclosed in Japanese Patent Laid-Open No. S61-206065(1986) for example has been used where a position at which a pixel is inserted or a thinning position is varied randomly to thereby suppress a local change in the concentration.

However, when the method disclosed in Japanese Patent Laid-Open No. S61-206065(1986) is used to subject the entire face of an image to an interpolation or thinning processing, this has caused a disadvantage of an increased length of a boundary between a region including pixels (printing region) and a region not including pixels (a region of a paper background color) or a broken texture in the image. FIG. 13 illustrates an example where the pixels in the entire face of the image are randomly interpolated. Parts shown by circles show inserted pixels. The reference numeral 1301 denotes a status where inserted pixels cause a difference in the boundary among region including pixels and regions not including pixels. The reference numeral 1302 denotes a status where the insertion of pixels causes a significantly-broken shape of a texture that should be represented by a square composed of 4 pixels in the longitudinal direction and 4 pixels in the lateral direction.

The disadvantage of the increased boundary length means, in an image printing apparatus based on the electrophotographic method, an increased boundary length between a toner-attached region and a no-toner-attached region. This consequently causes a declined stability of the toner attachment, thereby causing disadvantageous scattered toner. The broken shape of the texture also causes an image lacking in smoothness.

SUMMARY OF THE INVENTION

An image printing apparatus according to the present invention includes: a printing unit that can print images on both sides of a recording medium; and an image correction unit for correcting the size of the image to be printed on a back side of the recording medium. The image correction unit subject, to a pixel insertion and extraction processing, a plurality of transition areas composed of pixel columns that continue in a sub scanning direction of the printing unit to thereby correct the size of the image.

According to the present invention, such an image printing apparatus can be provided that minimizes the above-described disadvantages involved with the processing of the correction (expansion or reduction) of the image size depending on the extension of a recording medium such as a paper.

Further features of the present invention will become apparent from the following description of exemplary embodiments (with reference to the attached drawings).

BRIEF DESCRIPTION OF THE DRAWINGS

FIG. 2 is a diagram showing the relationship of FIGS. 2A and 2B;

FIGS. 2A and 2B are flowcharts illustrating the flow of the processing for correcting the image size depending on the extension of a paper;

DESCRIPTION OF THE EMBODIMENTS

The following section will describe the best mode for carrying out the present invention with reference to the drawings.

Embodiment 1

Figure 1:
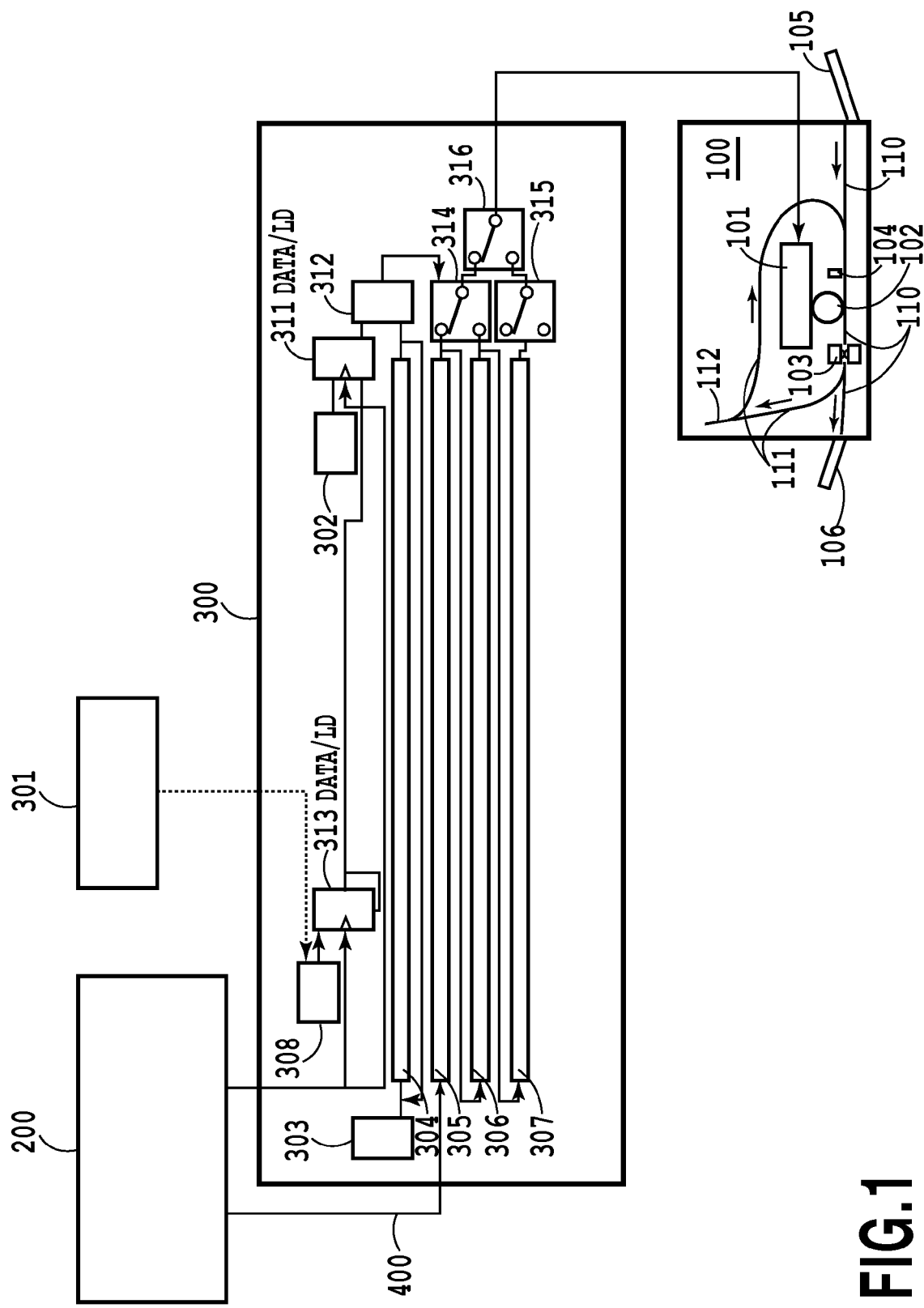
FIG. 1 illustrates an example of the configuration of an image printing apparatus according to Embodiment 1.

FIG. 1 illustrates an example of the configuration of an image printing apparatus according to Embodiment 1. Although FIG. 1 shows an image printing apparatus based on the electrophotographic method, the present invention is not limited to this. The Embodiment 1 is also applicable to image printing apparatuses based on any printing method that causes the extension of a recording medium such as a paper due to the printing of the recording medium. Furthermore, the recording medium is not limited to a paper and may be any medium that is extended when being subjected to printing.

The reference numeral 100 denotes a printing mechanism that includes an optical scanning drawing mechanism 101, a photoconductive drum 102, and a fixing mechanism 103.

Arrows in the printing mechanism 100 show paper feeding paths. The reference numeral 110 denotes a normal (front side) feeding path and the reference numeral 111 denotes a back side feeding path, respectively. The printing mechanism 100 uses the optical scanning drawing mechanism 101 to generate an optical latent image on the photoconductive drum 102 and develops the generated optical latent image by charged toner. The toner image on the photoconductive drum 102 is transferred on a paper sent from a paper feed tray 105 via the normal feeding path and is fixed by heat and a pressure by the fixing mechanism 103. The paper on which toner is already fixed is directly outputted to the paper catch tray 106 when the printing mode is a single-side printing mode. When the printing mode is a both-sides printing on the other hand, the paper sent through the fixing mechanism 103 is fed to aback side feeding path 111. The back side feeding path 111 has thereabove a switchback mechanism 112 at which the paper is turned so that the back side thereof sides the photoconductive drum 102 and is returned to the normal feeding path 110. Then, the back side of the paper is again subjected to a process including the generation of an optical latent image, toner development, transfer, and fixing. Then, the paper whose back side is already subjected to the printing process is outputted to a paper catch tray 106. The term "back side" herein means a side of a recording medium firstly printed and the term "back side" means the opposite side of the recording medium.

The reference numeral 104 denotes a paper detection sensor for detecting a paper. The paper detection sensor is used in Embodiment 2.

The reference numeral 200 denotes an image generation component that performs a processing for converting image data inputted from an external device or various image input units (not shown) to image data that can be processed by the printing mechanism 100. Specifically, the image generation component 200 subjects drawing information from a PC (PDL data written in a page description language) to a rendering process to generate image data of a bitmap format or to a conversion processing for converting multivalued image data inputted from a scanner to binary image data.

The reference numeral 300 denotes an image correction component that performs a processing for correcting image data generated by the image generation component 200 to have an appropriate size suitable for the extension and shrink rate of the paper. The processing by the image correction component 300 will be described later.

The reference numeral 301 denotes a user interface. Via this user interface 301, a user inputs the extension and shrink rate of the paper found through an image actually printed by test printing for example (e.g., reduction to 99.5%) or selects a printing mode (e.g., a single-side printing or a both-sides printing). Specifically, the user interface 301 functions as an extension and shrink rate setting unit or a printing mode selection unit.

The reference numeral 302 denotes a transition area setting component. The transition area setting component 302 sets a transition area to be subjected to an interpolation or thinning processing by the image correction component 300 (i.e., a value defining the line number of pixel columns continuing in the sub scanning direction that is to be subjected to a pixel insertion and extraction processing (e.g., 15)).

The reference numeral 303 denotes a pseudo random number generation component that generates a pseudo random number within the range matching the line number set by transition area setting component 302. For example, when a set value of 15 (lines) is retained in the transition area setting component 302, the total of 15 pseudo random number values from 0 to 14 is generated. These pseudo random numbers are used to diffuse coordinates to be subjected to pixel interpolation (insertion) or thinning. In this case, a position corresponding to the same main scanning coordinate in one transition area must be prevented from being subjected to a plurality of interpolations or thinnings by maintaining the same pseudo random number value for the main scanning coordinate of each transition area. Thus, as a unit for maintaining the pseudo random number value, a pseudo random number value retention component 304 is provided that can maintain the pseudo random number value equal to the pixel number in the main scanning direction.

The reference numerals 305 to 307 denote a pre-reading line buffer, a line buffer, and a delay line buffer, respectively that functions as a memory area for storing image data corresponding to one line of pixels. The line buffer 306 is used as a starting line. Thus, the pre-reading line buffer 305 stores therein image data corresponding to a pixel column advanced by one column. The delay line buffer 307 stores therein image data corresponding to a pixel column delayed by one column. The above-described pseudo random number value retention component 304 functions as a ring buffer that operates in accordance with the shift of the image data in the respective line buffers 305 to 307. When an interpolation or thinning processing to one transition area is completed, the pseudo random number value retention component 304 updates the pseudo random number value retained therein to prepare for an interpolation or thinning processing to the next transition area. The pseudo random number value retention component 304 and the respective line buffers 305 to 307 are driven by a pixel clock signal (not shown).

The reference numeral 308 denotes a correction coefficient setting component that performs a processing for calculating and setting a value that determines how many transition areas are to be subjected to a pixel insertion and extraction processing (correction coefficient). In the case of Embodiment 1, the correction coefficient is obtained by calculating an inverse number of the extension and shrink rate inputted to the user interface 301. When the input by the user is represented by percentage as described above for example, the correction coefficient can be calculated by the following formula.

Correction coefficient=|1100/(100−k)|

In the formula, k denotes an input value inputted through the user interface 301. When the input value k is 99.5 (0.5%-shrinkage) for example, a correction coefficient of "200" is calculated. When the input value k is 101 (1.0%-extension), a correction coefficient of "100" that is an absolute value of "−100" is calculated. Based on the magnitude of the calculated value, the number of transition areas per one page is determined. The higher the value is, the less the number of the transition areas is (i.e., the interval between transition areas is more increased). Negative and positive information before an absolute value is calculated is used as an index for determining whether a pixel is to be subjected to interpolation or thinning and thus is separately retained in a memory (not shown).

The reference numeral 311 denotes a transition area down counter that performs a reduction count to subtract, whenever a processing for one line is completed, one from the value (line number) set in the transition area setting component 302 at a timing of a main scanning synchronization signal 401.

The reference numeral 312 denotes a comparator that sequentially compares an output value from the transition area down counter 311 with the pseudo random number values retained in the pseudo random number value retention component 304 to determine which is higher.

The reference numeral 313 denotes a sub scanning line counter that performs a reduction count for subtracting the number of scanning lines from the value of the correction coefficient set in the correction coefficient setting component 308. Specifically, when the optical scanning drawing mechanism 101 includes therein a laser light source (not shown) of a single beam, one is subtracted from the value of the correction coefficient set in the correction coefficient setting component 308. When the optical scanning drawing mechanism 101 includes therein multiple beams for the scanning by a plurality of beams, a value depending on the number of the beams is subtracted for the reduction count.

When the reduction count results in a zero or clear value, the value of the correction coefficient set in the correction coefficient setting component 308 is newly reloaded.

The reference numerals 314 to 316 denote a signal selector. The signal selector 314 selects a pixel value retained in the pre-reading line buffer 305 or the line buffer 306 depending on the comparison result by the comparator 312 to output the value. The signal selector 315 selects a pixel value retained in the line buffer 306 or the delay line buffer 307 depending on the comparison result by the comparator 312 to output the value. The signal selector 316 outputs, for each one pixel, the output value from the signal selector 314 or the signal selector 315 based on the positive or negative information obtained through the calculation of the correction coefficient by the correction coefficient setting component 308. When a value prior to the calculation of an absolute value is a positive value, the output value from the signal selector 315 is selected and is outputted. This means that a pixel is inserted for expansion. When a value prior to the calculation of an absolute value is a negative value, the output value from the signal selector 314 is selected and is outputted. This means that a thinning processing is performed to thin-out pixels for reduction.

The reference numeral 400 denotes an image signal of image data generated by the image generation component 200. This image signal is inputted to the pre-reading line buffer 305, the line buffer 306, and the delay line buffer 307.

The reference numeral 401 denotes a main scanning synchronization signal that is inputted to the transition area down counter 311 and the sub scanning line counter 313 and that is used as a counting unit in these counters.

Although not shown in FIG. 1, the image printing apparatus includes, in addition to the above-described CPU for controlling the respective components in an integrated manner, a memory for storing OS and an application program and the execution result thereof for example.

Figure 2B:
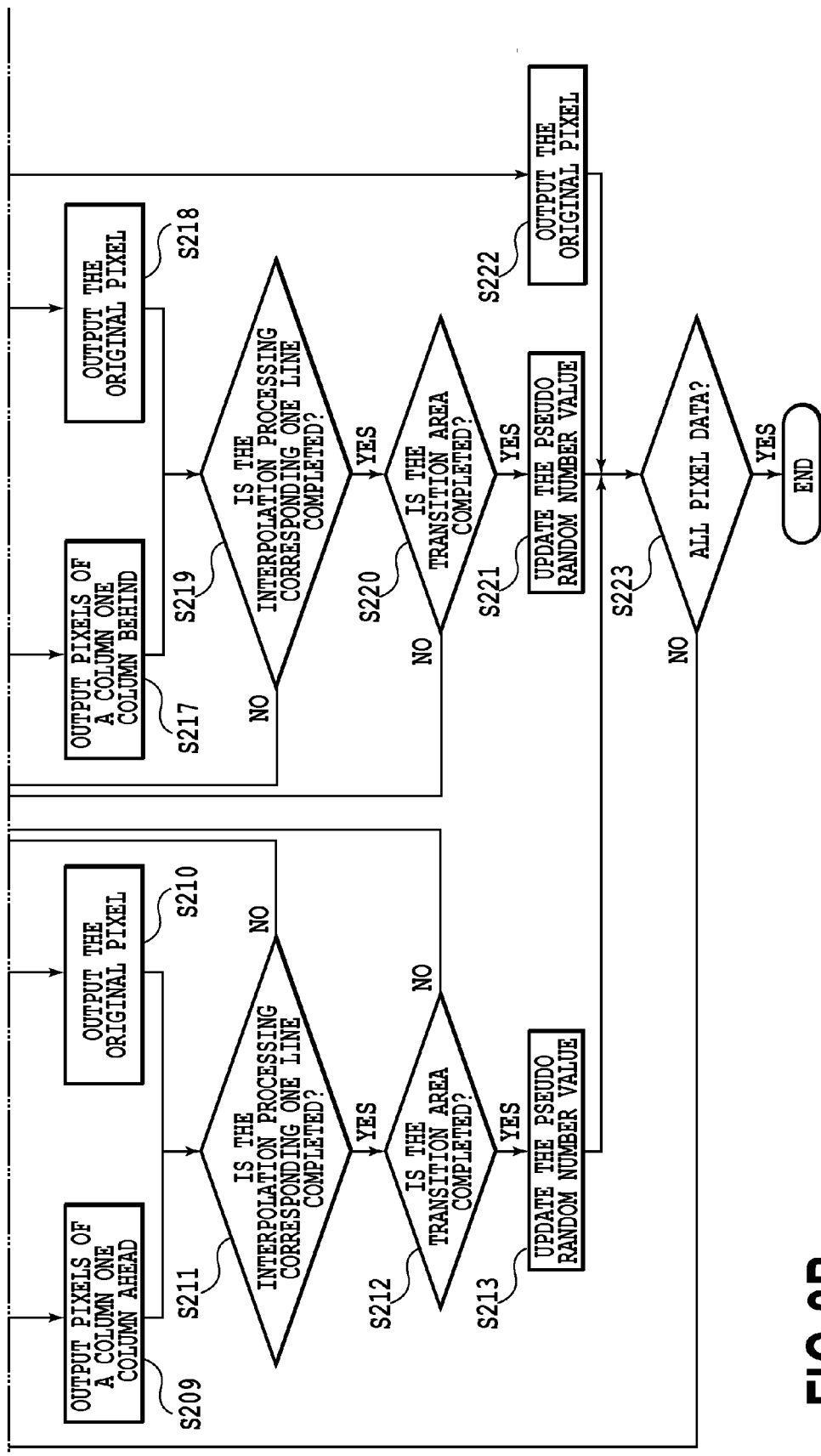

FIGS. 2A and 2B are flowcharts illustrating the flow of the processing in the image correction component 300 when a both-sides printing processing is performed in the image printing apparatus according to this embodiment (i.e., a processing for correcting the image size depending on the extension of the paper). The following section will describe, with reference to this flowchart, the details of the processing by the image correction component 300. However, the processing shown by this flowchart must be of course started after completing the printing processing of the front side of the paper. Thus, the following section will briefly describe the front side printing processing that must be completed prior to the processing by the image correction component 300.

First, prior to the execution of the both-sides printing processing, the image printing apparatus must complete a processing for setting a correction coefficient depending on the paper extension and shrink rate and a processing for selecting a printing mode, respectively. Specifically, when the user inputs via the user interface 301 the paper extension and shrink rate known in advance through a test printing for example, the correction coefficient setting component 308 calculates and sets the above-described correction coefficient based on the inputted value. Then, when the user selects a both-sides printing mode through the user interface 301, the image printing apparatus performs an initialization processing for a both-sides printing (e.g., a processing for storing the pseudo random number value generated by the pseudo random number generation component 303 in the pseudo random number value retention component 304).

After the completion of the initialization processing as described above, the image printing apparatus causes the image generation component 200 to generate image data of a bitmap format that can be processed by the printing mechanism 100. The generated image data is firstly printed on the front side of the paper by the printing mechanism 100 and is subsequently printed on the back side of the paper through the back side feeding path 111.

The processing as described above is completed as a processing prior to the back side printing processing.

When the back side printing processing is started, the CPU in Step 201 firstly loads the correction coefficient value set in the correction coefficient setting component 308 to the sub scanning line counter 313.

Next, in Step 202, the CPU starts the reduction count of the loaded correction coefficient value. The reduction count is performed based on the main scanning synchronization signal 401.

In Step 203, the CPU determines whether the value of the sub scanning line counter 313 is cleared to zero or not. When the value of the sub scanning line counter 313 is not cleared as zero, the processing proceeds to Step 222. When the value of the sub scanning line counter 313 is cleared to zero, the processing proceeds to Step 204.

In Step 222, the signal selector 316 selects a pixel value retained in the line buffer 306 to output the value. Specifically, until the value of the sub scanning line counter 313 is cleared to zero, a normal region is determined that is not a transition area to be subjected to a correction processing. Thus, the original pixel value is directly outputted without performing the pixel insertion and extraction processing.

On the other hand, in Step 204, the CPU reloads the set value of the correction coefficient setting component 308 to the sub scanning line counter 313 subjected to the zero clear processing. After the reloading, the processing proceeds to Step 205.

In Step 205, the CPU refers to the positive or negative information that is obtained through the calculation of the correction coefficient and that is retained in the memory to set a signal to be selected by the signal selector 316. If the information is positive, the CPU sets a signal so that the signal selector 316 selects an output value from the signal selector 315 and the processing proceeds to Step 214 (interpolation processing). If the information is negative on the other hand, the CPU sets a signal so that the signal selector 316 selects an output value from the signal selector 314 and the processing proceeds to Step 206 (thinning processing).

In Step 206, the CPU loads the value set in the transition area setting component 302 (the line number defining the transition areas) to transition area down counter 311.

In Step 207, the CPU performs a reduction count to subtract one from the set value loaded to the transition area down counter 311. The reduction count is performed based on the main scanning synchronization signal 401.

In Step 208, the comparator 312 compares the output value from the transition area down counter 311 with a pseudo random number value retained in the pseudo random number value retention component 304. When the output value from the transition area down counter 311 is higher than the pseudo random number value, the processing proceeds to Step 210. When the output value from the transition area down counter 311 is lower than the pseudo random number value, the processing proceeds to Step 209. The output value from the transition area down counter 311 is of course reduced through the reduction count. This means that this comparison processing increases a probability at which the pseudo random number value exceeds the output value from the transition area down counter 311.

In Step 209, the signal selector 314 selects an output from the pre-reading line buffer 305. As a result, the output from the pre-reading line buffer 305 is inputted to the signal selector 316.

On the other hand, in Step 210, the signal selector 314 selects an output from the line buffer 306. As a result, the output from the line buffer 306 is inputted to the signal selector 316.

In Step 211, the CPU determines whether the thinning processing corresponding to one line is completed or not. When thinning processing corresponding to one line is completed, the processing proceeds to Step 212. When thinning processing corresponding to one line is not completed, the processing returns to Step 208 to repeat Step 208 to Step 210 until the thinning processing corresponding to one line is completed.

In Step 212, the CPU determines whether the thinning processing to the transition area is completed or not (i.e., whether the value of the transition area down counter 311 is cleared to zero or not). When the value of the transition area down counter 311 is cleared to zero, the processing proceeds to Step 213. When all lines constituting the transition area are not yet subjected to the processing, the processing returns to Step 206 to repeat Step 207 to Step 211 until the processing is completed.

By the processing as described above, the signal selector 316 receives any of the pixel values retained in the pre-reading line buffer 305 or the line buffer 306 selectively inputted for every one pixel. Then, with a gradual increase of the probability of a higher pseudo random number value, the image data corresponding to one line is thinned-out in the transition area. After the completion of the thinning processing to the transition area, the processing proceeds to Step 213.

In Step 213, the CPU updates the pseudo random number value retained in the pseudo random number value retention component 304 to prepare for the thinning processing to the next transition area.

Figure 3A:
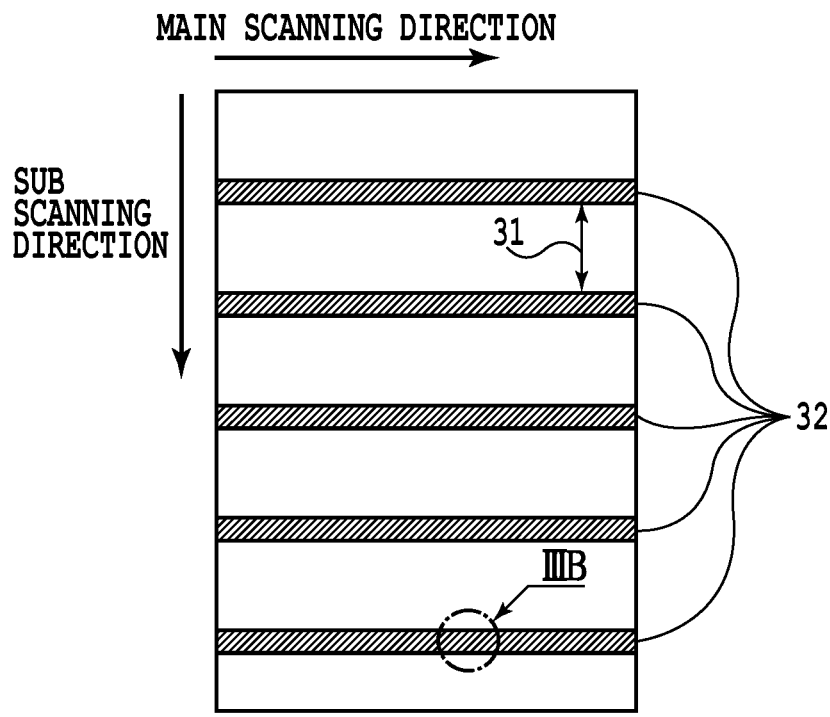
FIGS. 3A to 3C illustrate an example of image data subjected to a thinning processing.
Figures 3B, 3C:
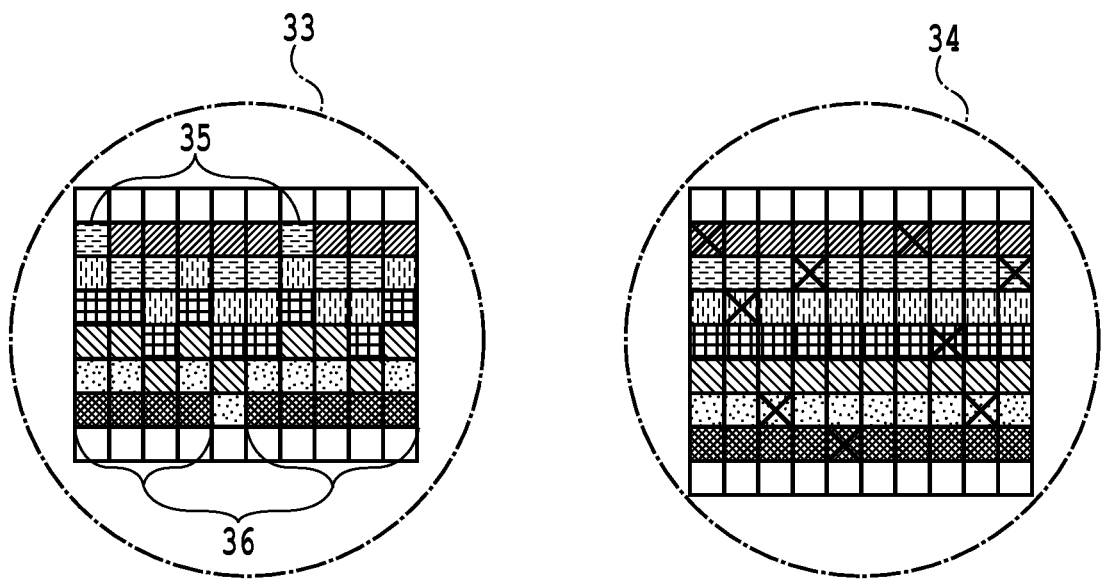

FIGS. 3A to 3C illustrate an example of image data subjected to a thinning processing. The reference numeral 31 denotes an interval between transition areas that is defined based on the correction coefficient set in the correction coefficient setting component 308. The reference numeral 32 denotes a transition area. The reference numeral 33 is a partial enlarged view of the transition area subjected to the thinning processing. The reference numeral 39 is a partial enlarged view of the transition area not yet subjected to the thinning processing. As can be seen from the transition area 34, the line number set in the transition area setting component 302 has a value of 7. Also as can be seen from the transition area 33, pixels corresponding to one line are thinned out by the thinning processing to those corresponding to six lines. The reference numeral 35 denotes pixels for which an output from the pre-reading line buffer 305 is selected in the first line of the transition area subjected to the thinning. The reference numeral 36 denotes pixels in the sixth line of the transition area subjected to the thinning for which the output from the pre-reading line buffer 305 is selected. As can be seen from FIGS. 3A to 3C, pixels closer to the beginning of the transition area has a higher ratio at which the output value from the transition area down counter 311 exceeds the pseudo random number value. Thus, many pixels have the output value from the line buffer 306. Then, as the thinning processing proceeds and an end of the transition area is approached, a higher ratio is caused at which the pseudo random number value exceeds the output value from the transition area down counter 311. Thus, many pixels have the output value from the pre-reading line buffer 305.

After the completion of the thinning processing to the transition area, the CPU in Step 223 determines whether all of the image data corresponding to one page is subjected to the processing by the image correction component 300 or not. When there is image data not yet subjected to the processing, the processing returns to Step 202 to subject the next transition area to a thinning processing for example. The data of the pixel column stored in the line buffer 306 after the completion of the thinning processing to the first transition area (i.e., loops after the second loop) is data corresponding to pixels in a column that is one column ahead of the pixel column that would have been stored without a thinning processing. Then, the pre-reading line buffer 305 stores therein the data of the pixel column one column ahead of this column.

In the manner as described above, the thinning processing is performed only on a predetermined number of transition areas of image data corresponding to one page.

Similarly, an interpolation processing is performed in the steps after Step 214.

First, a processing for loading a transition area is performed (Step 214). Then, a reduction count is performed to subtract one from the loaded set value (Step 215). Then, a comparison processing is performed to compare the output value from the transition area down counter 311 with the pseudo random number value retained in the pseudo random number value retention component 304 (Step 216). When the comparison result shows that the output value from the transition area down counter 311 is higher than the pseudo random number value retained in the pseudo random number value retention component 304, then the signal selector 315 in Step 218 selects the output from the line buffer 306. When the comparison result shows that the output value from the transition area down counter 311 is lower than the pseudo random number value retained in the pseudo random number value retention component 304, then the signal selector 315 in Step 217 selects the output from the delay line buffer 307. Then, each output value is inputted to the signal selector 316.

In Step 219, the CPU determines whether the interpolation processing corresponding to one line is completed or not. When the interpolation processing corresponding to one line is completed, the processing proceeds to Step 220. When the interpolation processing corresponding to one line is not completed, the processing returns to Step 216 to repeat Step 216 to Step 218 until the interpolation processing corresponding to one line is completed.

In Step 220, the CPU determines whether the interpolation processing to the transition area is completed or not (i.e., whether the value of the transition area down counter 311 is cleared to zero or not). When the value of the transition area down counter 311 is cleared to zero, the processing proceeds to Step 221. When the processing to all lines constituting the transition area is not yet completed, the processing returns to Step 215 repeat the processings from Step 215 to Step 219 until the processing to all lines constituting the transition area is completed.

By the processing as described above, the signal selector 316 receives any of the pixel value retained in the line buffer 306 or the pixel value retained in the delay line buffer 307 that is selectively inputted for every one pixel. Then, with a gradual increase of the probability at which the pseudo random number value is higher, the image data corresponding to one line is inserted to the transition area. Then, when the interpolation processing to the transition area is completed, the processing proceeds to Step 221.

In Step 221, the CPU updates the pseudo random number value retained in the pseudo random number value retention component 304 to prepare for the interpolation processing to the next transition area.

Figure 4:
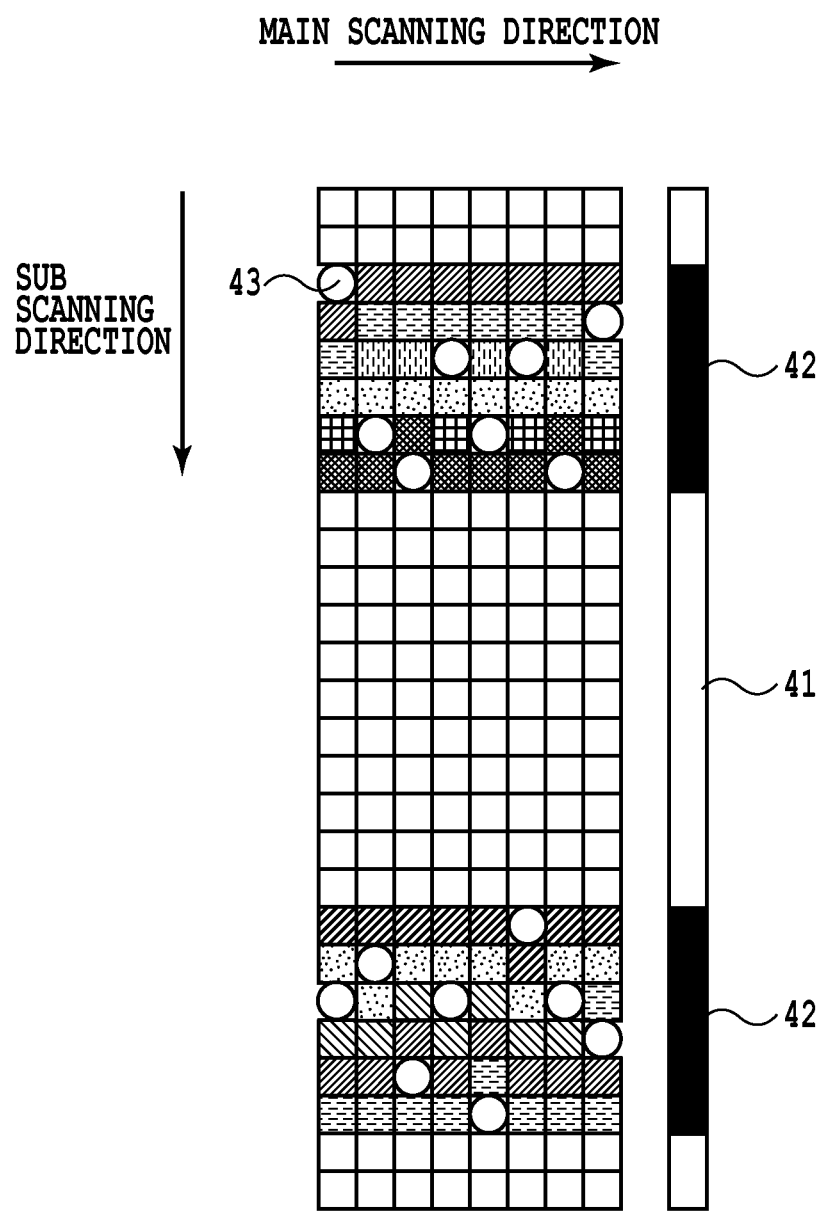
FIG. 4 illustrates an example of image data subjected to an interpolation processing.

FIG. 4 illustrates an example of image data subjected to the interpolation processing. The reference numeral 41 denotes the interval between transition areas that is defined by the correction coefficient set by the correction coefficient setting component 308. The reference numeral 42 denotes the transition area after the interpolation processing when the line number set to the transition area setting component 302 has a value of 5. By the interpolation processing, pixels corresponding to one line are inserted to result in 6 lines. The reference numeral 43 denotes a pixel inserted by the interpolation processing.

When the interpolation processing to the transition area is completed, the CPU in Step 223 determines whether all of the image data corresponding to one page is subjected to the processing by the image correction component 300 or not. When there is image data not yet subjected to the processing, the processing returns to Step 202 to perform an interpolation processing to the next transition area for example. The data of the pixel column stored in the line buffer 306 after the completion of the interpolation processing to the first transition area (i.e., loops after the second loop) is data corresponding to pixels in a column that is one column behind of the pixel column that would have been stored without an interpolation processing.

In the manner as described above, the interpolation processing is performed only on a predetermined number of transition areas of image data.

Figure 5:
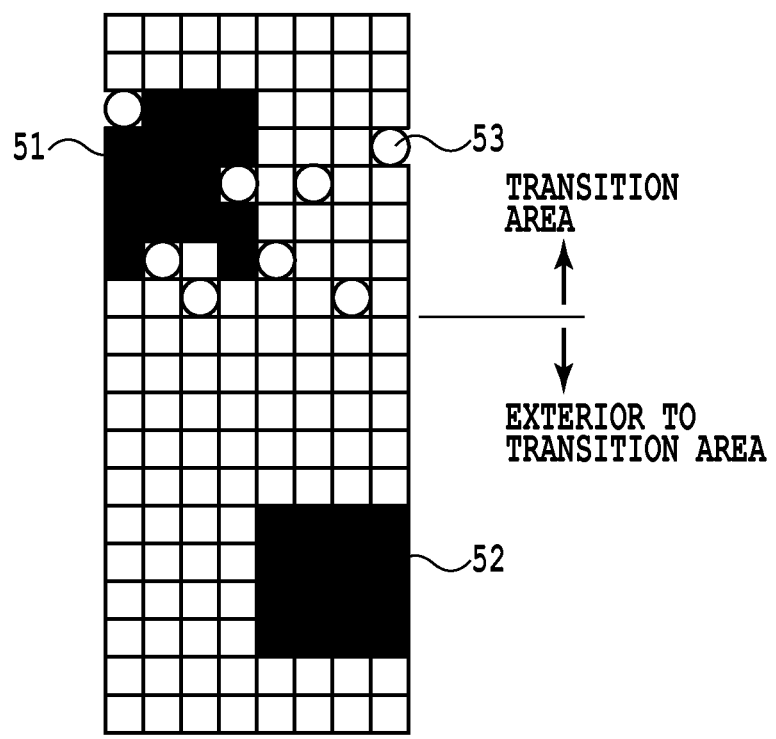
FIG. 5 illustrates the influence on the texture by the interpolation processing of the present invention.

FIG. 5 illustrates the influence on the shape of the texture by the interpolation processing of the Embodiment 1. The reference numeral 51 denotes a texture existing in the transition area. The reference numeral 52 denotes a texture existing exterior to the transition area.

As can be seen from FIG. 5, according to the Embodiment 1, the texture in the transition area has a broken shape due to the insertion of pixels. However, the texture existing exterior to the transition area is prevented from having a broken shape at all. Furthermore, a pseudo random number is used for each transition area to diffuse coordinates to be subjected to a pixel interpolation or thinning. This consequently prevents a disadvantage of an increased boundary length, thus preventing the entire image from lacking in smoothness.

Embodiment 2

In Embodiment 1, the correction coefficient was calculated based on the paper extension and shrink rate inputted by the user through the user interface 301. The following section will describe an embodiment as Embodiment 2 where the correction coefficient is automatically calculated using the paper detection sensor 104 provided in the normal feeding path 110.

As can be seen from FIG. 1, the paper detection sensor 104 exists between the meeting point of the back side feeding path 111 after the switchback mechanism 112 and the normal feeding path 110 and the photoconductive drum 102 for transferring a toner image. This paper detection sensor 104 is used to measure the time required to print a front side of a paper and the time required to print the back side to thereby automatically calculate the correction coefficient.

Figure 6:
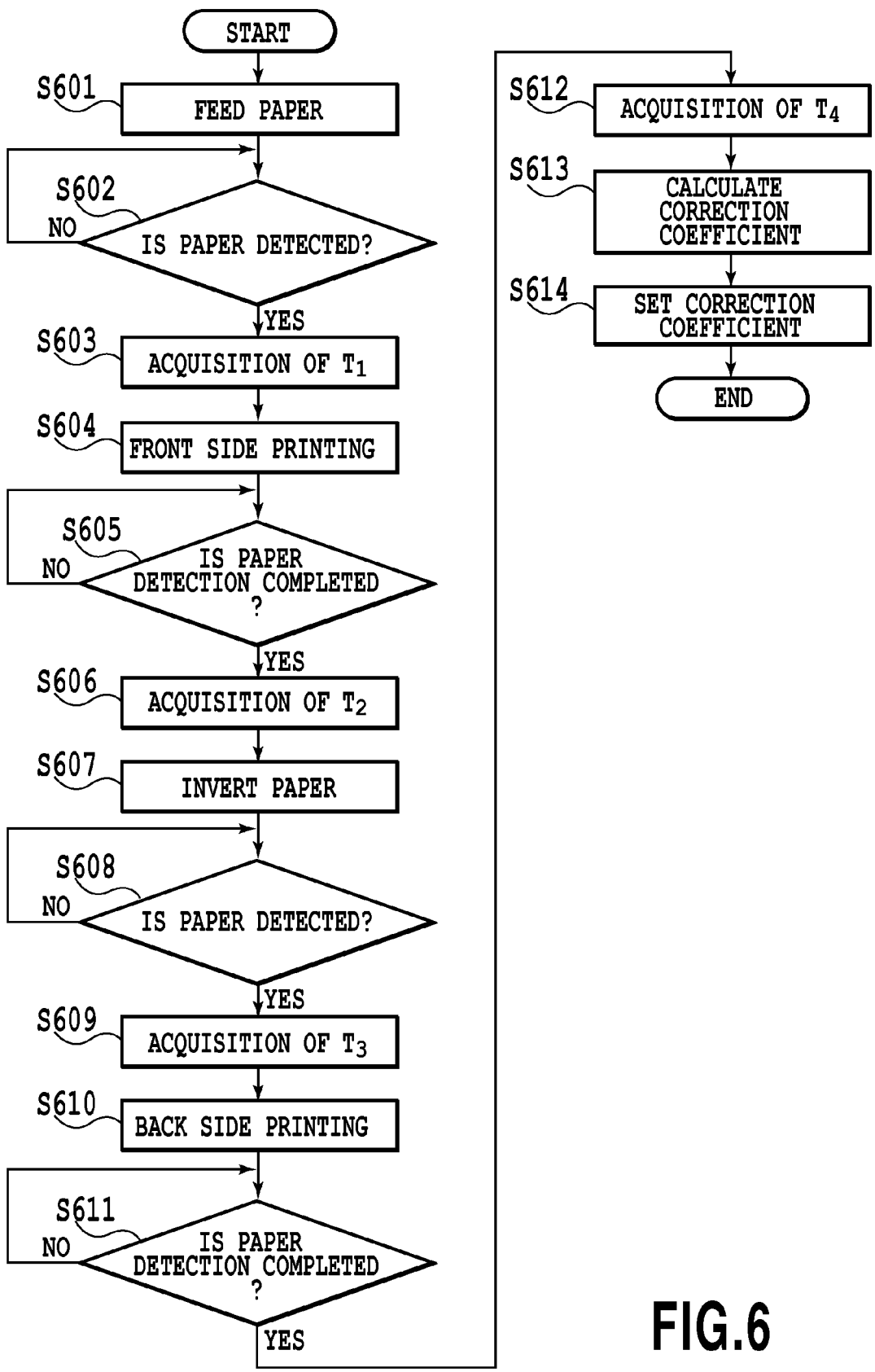
FIG. 6 is a flowchart illustrating the flow of a processing for automatically calculating a correction coefficient.

FIG. 6 is a flowchart illustrating the flow of the processing for automatically calculating a correction coefficient.

In Step 601, upon receiving an instruction from a user to start an auto calibration, the CPU causes one paper from taken out of the paper feed tray 105 of FIG. 1 to feed the paper to the normal feeding path 110. Simultaneously with the start instruction, the CPU also starts the time count by a time measurement unit (not shown).

In Step 602, the CPU determines whether the paper is detected by the paper detection sensor 104 or not. When the paper is detected, then the processing proceeds to Step 603.

In Step 603, the CPU acquires, from the time measurement unit, the time (T1) form the instruction to start the auto calibration (start of the time count) to the detection of the paper and stores the time (T1) in a memory component (not shown).

In Step 604, the printing mechanism 100 performs a printing processing on the front side of the paper.

In Step 605, the CPU determines whether or not the printing processing to the front side is completed and no more paper is detected by the paper detection sensor 104. When not more paper is detected, the processing proceeds to Step 606.

In Step 606, the CPU acquires, from the time measurement unit, the time (T2) from the instruction to start the auto calibration to the completion of the detection of the paper and stores the time (T2) in a memory component (not shown).

In Step 607, the printing mechanism 100 sends, to the switchback mechanism 112, the paper subjected to the printing processing to the front side to invert the top side and the back side of the paper so that the back side of the paper can be printed. Then, the paper is again sent to the normal feeding path 110.

In Step 608, the CPU determines whether a paper is detected by the paper detection sensor 104 or not. When a paper is detected, the processing proceeds to Step 609.

In Step 609, the CPU acquires, from the time measurement unit, the time (T3) from the instruction to start the auto calibration to the detection of the paper and stores the time (T3) in a memory component (not shown).

In Step 610, the printing mechanism 100 subjects the back side of the paper to a printing processing.

In Step 611, the CPU determines whether the printing processing to the back side is completed and no more paper is detected by the paper detection sensor 104 or not. When no more paper is detected, then the processing proceeds to Step 612.

In Step 612, the CPU acquires, from the time measurement unit, the time (T4) from the instruction to start the auto calibration to the completion of the detection of the paper and stores the time (T4) in a memory component (not shown).

In Step 613, the correction coefficient setting component 308 determines a value (correction coefficient) for determining how many transition areas are to be subjected to a pixel insertion and extraction processing. Specifically, the correction coefficient setting component 308 acquires T1 to T4 stores in the memory component and applies T1 to T4 to the following formula to thereby calculate the correction coefficient.

$$\text{Correction coefficient} = |1/(1-(T2-T1)/(T4-T3))|$$

Figure 7:
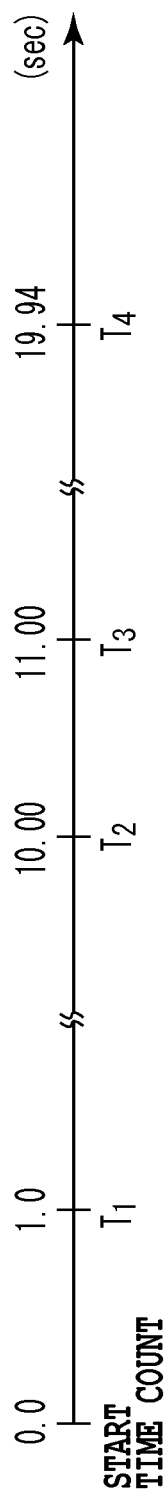
FIG. 7 illustrates the flow of the time from the start of the time count to the acquisition of T4.

FIG. 7 illustrates the period from the start of the time count to the acquisition of T4 in a time-series manner. In FIG. 7, T1 is 1.00 second, T2 is 10.00 seconds, T3 is 11.00 seconds, and T4 is 19.94 seconds. When the values of T1 to T4 shown in FIG. 7 are applied to the above formula, "149", which is an absolute value of "−149", is calculated as a correction coefficient. The higher the value is, the less transition areas are, as in Embodiment 1.

In Step 614, the CPU sets the calculated correction coefficient in the correction coefficient setting component 308. The CPU also separately retains, in a memory, the positive or negative information prior to the calculation of the absolute value as an index used to determine whether a pixel is interpolated or thinned out.

Another method for calculating a correction coefficient also may be used to perform a test printing for automatically calculating a correction coefficient by a plurality of papers to calculate an average value thereof as a correction coefficient.

A correction coefficient can be automatically calculated by carrying out the processing as described above during a calibration printing or as a background during a normal printing.

Embodiment 3

Some printing mechanisms realize the formation of an image by superimposing a plurality of drawings and scannings because single drawing and scanning provide an insufficient printing concentration in the resultant output. Another printing mechanism equalizes drawing positions by a multi scanning because a printing density exceeding 1000 dpi causes a pixel size to be smaller than 25.4 μm to cause an undesired exchange of pixel drawing positions depending on a paper position accuracy. As described above, in the case where an image is formed on a paper by a multi drawing and scanning, a difference in the size is also undesirably caused between an image formed by the first drawing and scanning and an image formed by drawings and scannings after the second drawing and scanning. Thus, a processing is required to correct the image size. When the same side of a paper is subjected to a plurality of drawings and scannings, a visually-favorable result can be obtained by using transition areas that are at different positions depending on the respective drawings and scannings.

In Embodiment 3, the transition areas are allowed to be at different positions depending on the respective drawings and scannings by providing the image correction component 300 for each drawing and scanning and offsetting the starting position of the transition area at the second and subsequent drawings and scannings to dislocate the phases.

Figure 8:
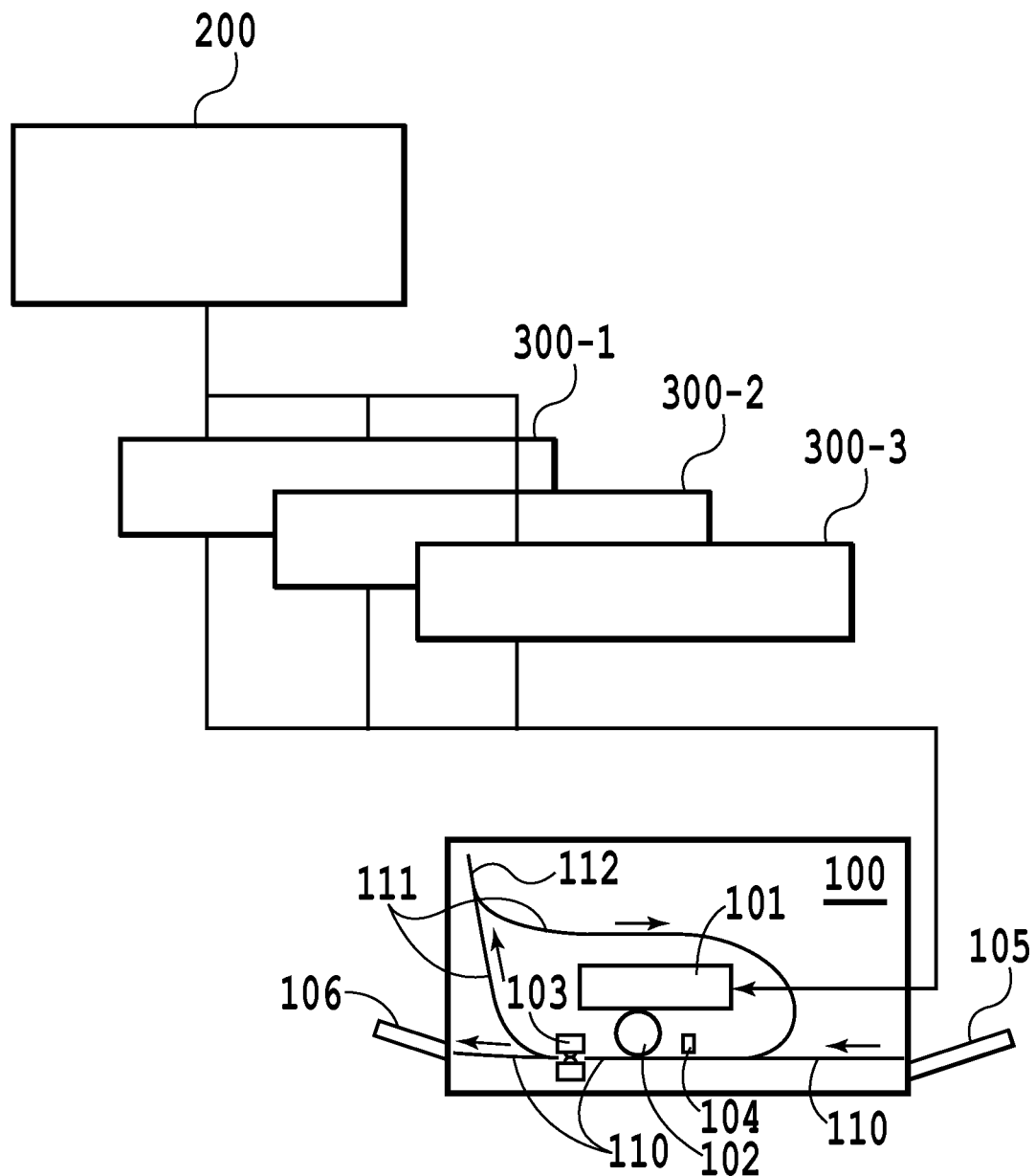
FIG. 8 illustrates transition areas dislocated to one another.

FIG. 8 illustrates the configuration of an image printing apparatus for forming an image by there multi drawings and scannings. Embodiment 3 is different from FIG. 1 of Embodiment 1 in that this image printing apparatus includes three image correction components 300-1, 300-2, and 300-3 for correcting image data to have an appropriate size depending on the extension and shrink rate of the paper. The image correction component 300-1 generates image data used in the first drawing and scanning. The image correction component 300-2 generates image data used in the second drawing and scanning. The image correction component 300-3 generates image data used in the third drawing and scanning. This configuration may of course change depending on the number of the multi drawing and scanning. Thus, an image can be formed by N multi drawings and scannings by providing N image correction components 300.

Figure 9:
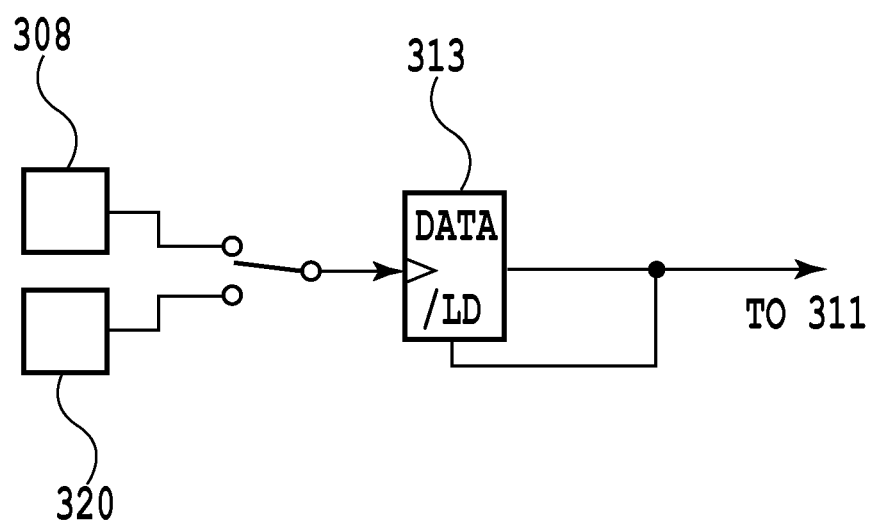
FIG. 9 illustrates the configuration of an image printing apparatus for forming an image by a plurality of multi drawing and scannings.

FIG. 9 is a partial view illustrating the internal configuration of the image correction component 300-2 for the second drawing and scanning and the image correction component 300-3 for the third drawing and scanning. FIG. 9 is different from the image correction component 300 of FIG. 1 in that an offset resistor 320 is provided in parallel to the correction coefficient setting component 308. In order to dislocate the first transition area by an arbitrary line number, the value set in the correction coefficient setting component 308 is set in the offset resistor 320. For the image correction component 300-2 for the second drawing and scanning and the image correction component 300-3 for the third drawing and scanning, different values are set in the offset resistor 320, respectively. This consequently prevents the transition area of the second drawing and scanning from being superimposed with the transition area of the third drawing and scanning. As an initial value for starting the drawing, the value of each offset resistor 320 is loaded to the sub scanning line counters 313 of the respective image correction components (300-1, 300-2, and 300-3). When the loaded initial value is reduced to zero by the reduction count, then the value set in the correction coefficient setting component 308 is reloaded to the sub scanning line counter 313.

Figure 10:
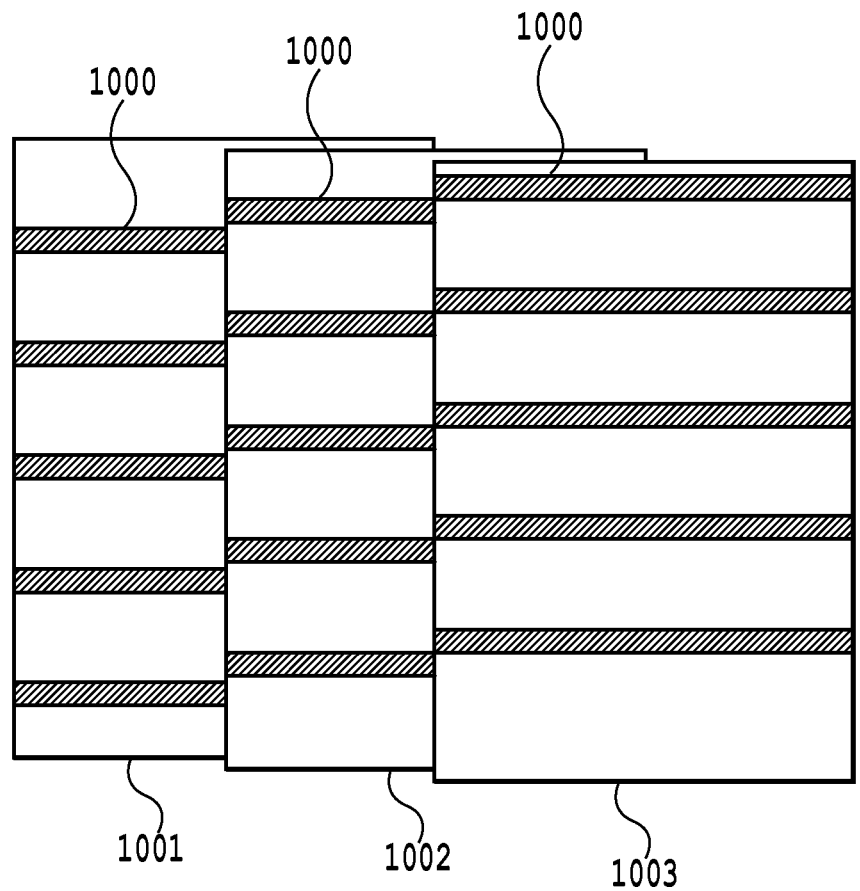
FIG. 10 illustrates an example of the internal configuration of an image correction component according to Embodiment 3.

FIG. 10 illustrates the transition areas mutually dislocated by the formation of an image by the three drawings and scannings by the image printing apparatus according to this embodiment. The reference numeral 1000 denotes a transition area. The reference numeral 1001 denotes the first drawing and scanning. The reference numeral 1002 denotes the second drawing and scanning. The reference numeral 1003 denotes the third drawing and scanning. As can be seen from FIG. 10, the transition areas have thereamong a uniform interval in the respective drawings and scannings. However, the transition areas are started at different positions, thus consequently preventing the transition areas from being superimposed to one another in the first, second, and third drawings and scannings. Thus, the transition areas are mutually dislocated.

As described above, according to the image printing apparatus including the printing mechanism for realizing the formation of an image by superimposing a plurality of drawings and scannings, the transition area to be subjected to a correction processing can be provided at different position depending on each drawing and scanning to thereby disperse the breakage of the texture caused in eth transition area for example.

Embodiment 4

In a color printing, a printing processing is performed using pigments of some primary colors and black. For example, in the case of a color image printing apparatus based on the electrophotographic method, toners of the respective colors of cyan, magenta, yellow, and black are simultaneously transferred onto a paper. Thus, the extension of the paper has no influence on a single side. However, the extension of the paper has an influence on the printing on both sides as in a single color printing.

This disadvantage can be solved by allowing the processing systems for the respective colors to include the correction system shown in Embodiment 1, respectively. However, when the transition areas are at the same position, a broken minute texture is caused in the same regions of all of the colors, thus causing a risk where a particular region having an image lacking in smoothness is visually recognized.

To prevent this, Embodiment 4 provides such an image printing apparatus that suppresses an image lacking in smoothness is in a particular region from being visually recognized by changing the position of the transition area for each color. This image printing apparatus will be described below.

Figure 11:
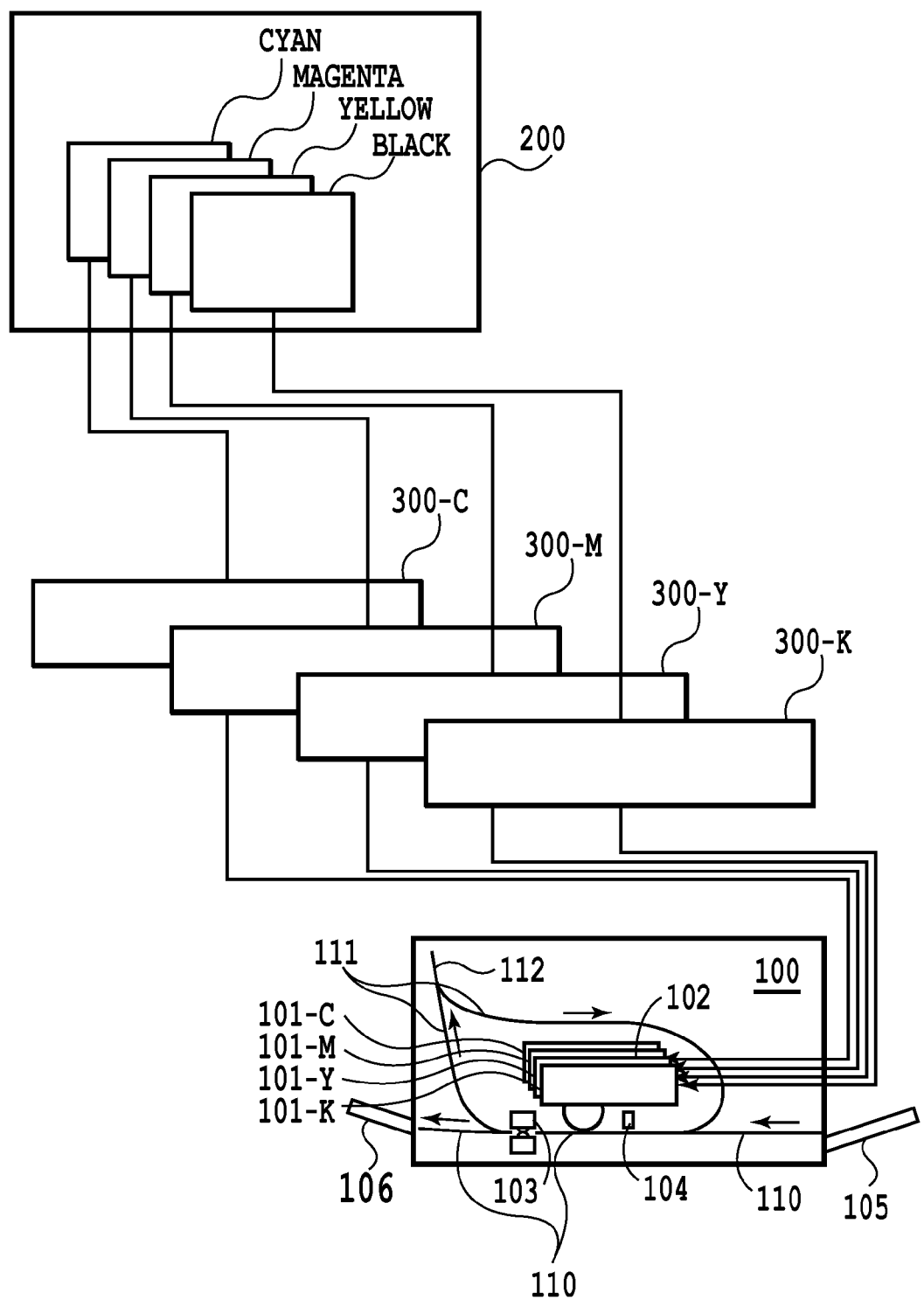
FIG. 11 illustrates an example of the configuration of an image printing apparatus according to Embodiment 4.

FIG. 11 illustrates an example of the configuration of the image printing apparatus according to this embodiment.

The image generation component 200 generates different image data for each color. Thus, the image generation component 200 includes image correction components (300-C, 300-M, 300-1, and 300-K) for image data of the respective colors. The printing mechanism 100 thus also includes optical scanning drawing mechanisms (101-C, 101-M, 101-Y, and 101-K) for the respective colors that are collectively printed on a paper. As described above, a color image is printed by image data corresponding to colors to be used for the printing, the image correction component 300, and the optical scanning drawing mechanism 101 so that the image can be printed on a back side by dislocating the positions of the transition areas for the respective colors. The transition areas for the respective colors can be dislocated by the method described in Embodiment 3. Specifically, each of the image correction components 300-C, 300-M, 300-Y, and 300-K includes the offset resistor 320 that is provided in parallel to the correction coefficient setting component 308 so that a different value can be provided to the offset resistor 320 of each image correction component. As a result, a correction processing can be carried out without causing superimposed transition areas during the drawings and scannings of the respective colors.

Embodiment 5

When a printing mechanism includes a multibeam laser light source from which a plurality of beams can be simultaneously emitted for scanning, drawings and scannings are simultaneously performed by a plurality of lasers emitted in a stripe-like form. In the case of the printing mechanism using multibeam as described above, pixels in lines in a stripe-like form that are simultaneously scanned are arranged with a stable interval. On the other hand, pixels at a boundary between the lines in a stripe-like form are arranged with a relatively-unstable interval because of the stability of the paper feed or scanning position. For example, it has been known with regard to the stability of the scanning position that that a manufacture tolerance in the mirror surface among the respective polygon mirrors cause a difference in the inclination that causes an interval among the respective scannings to vary depending on the cycle of the number of the surfaces of the polygon.

When the technique of Embodiment 1 is directly applied to the printing mechanism using a multibeam laser light source having the features as described above, dislocated pixels are caused in a higher-than-expected amount at a boundary of transition areas in lines in a stripe-like form. Thus causes a risk where a deteriorated image quality may be recognized. To prevent this, Embodiment 5 will be described where starting positions of transition areas are dislocated so that the transition areas are always within lines in a stripe-like form that are simultaneously scanned (or within a multibeam width).

In this embodiment, starting positions of transition areas are dislocated by adding a condition to a logic for determining the start of a transition area. Specifically, in Embodiment 1, the image correction component 300 was configured to start a transition area immediately after the output value of the sub scanning line counter 313 was cleared to zero. On the other hand, a delay processing is added to this configuration in this embodiment to thereby adjust a starting position of a transition area. Specifically, an M binary counter is used to count the residue of the sub scanning coordinate information in the reading and scanning of the image information. The image correction component 300 is configured so that a transition area is started only when the value of the sub scanning line counter 313 is cleared to zero and the output value from the M binary counter is 0. "M" means the number of beams that can be simultaneously scanned. It is assumed that the reading and scanning of the image information are synchronized with the optical scanning by the printing mechanism.

In order to configure the image correction component 300 as described above, such a flip-flop is provided between the sub scanning line counter 313 and the transition area down counter 311 that sets a value when a sequentially-changing output value from the sub scanning line counter 313 is 0 for example. Then, the value calculated based on the logical AND (AND) of the output value from the flip-flop and the output value from the M binary counter may be inputted to the transition area down counter 311. The flip-flop is cleared by the output from the M binary counter when the condition is established (i.e., when input values to the AND circuits are both 0).

By the configuration as described above, even when the output value from the sub scanning line counter 313 is 0, the set value of the transition area setting component 302 is not loaded to the transition area down counter 311 until the output value from the M binary counter is 0. This causes a proportional dislocation of a starting position of the transition area. So long as the set value (line number) of the transition area setting component 302 has a value smaller than M, the transition area is always within the multibeam width.

Figure 12:
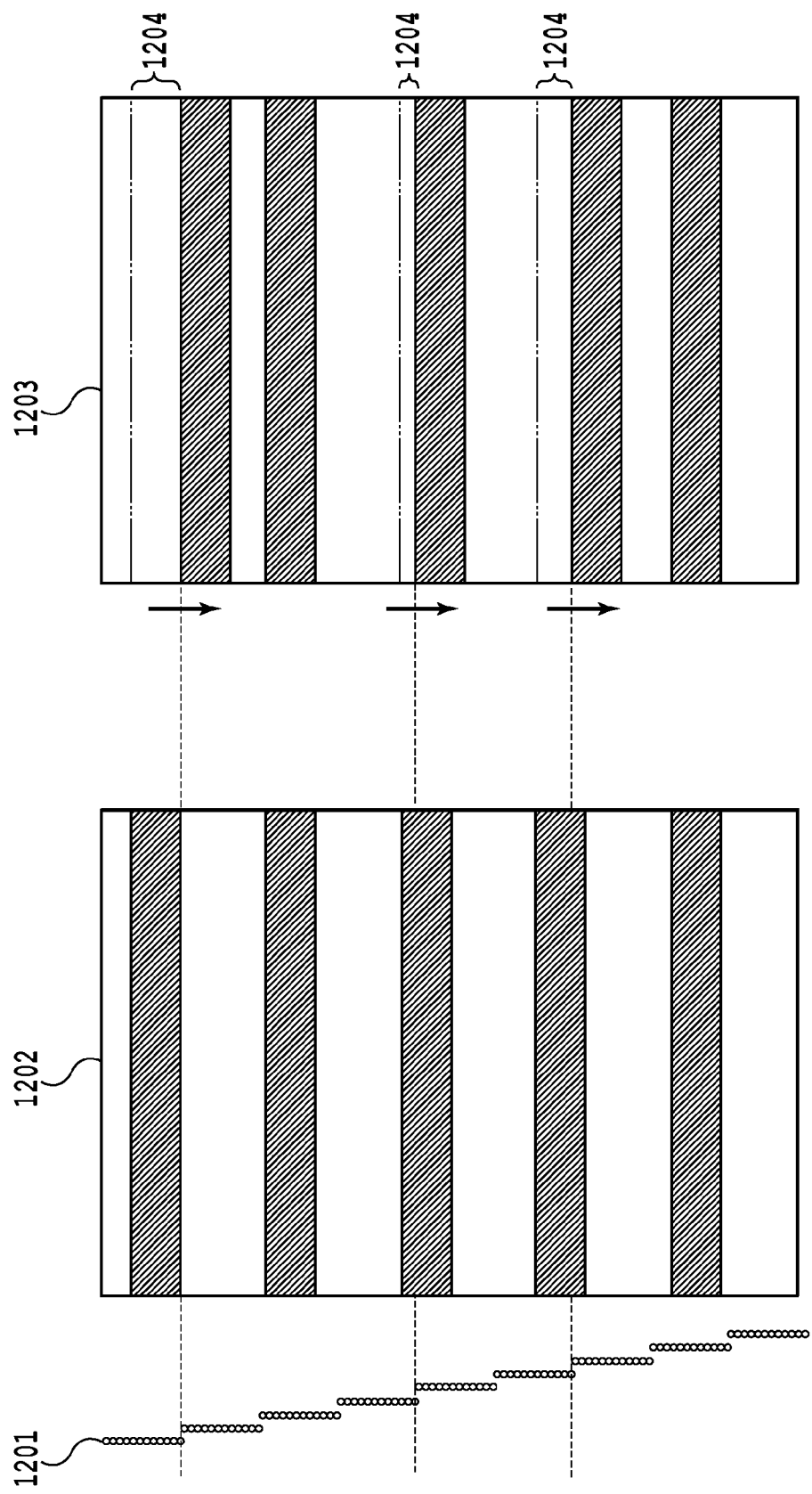
FIG. 12 illustrates an example of the result of a delay processing according to Embodiment 5.
Figure 13:
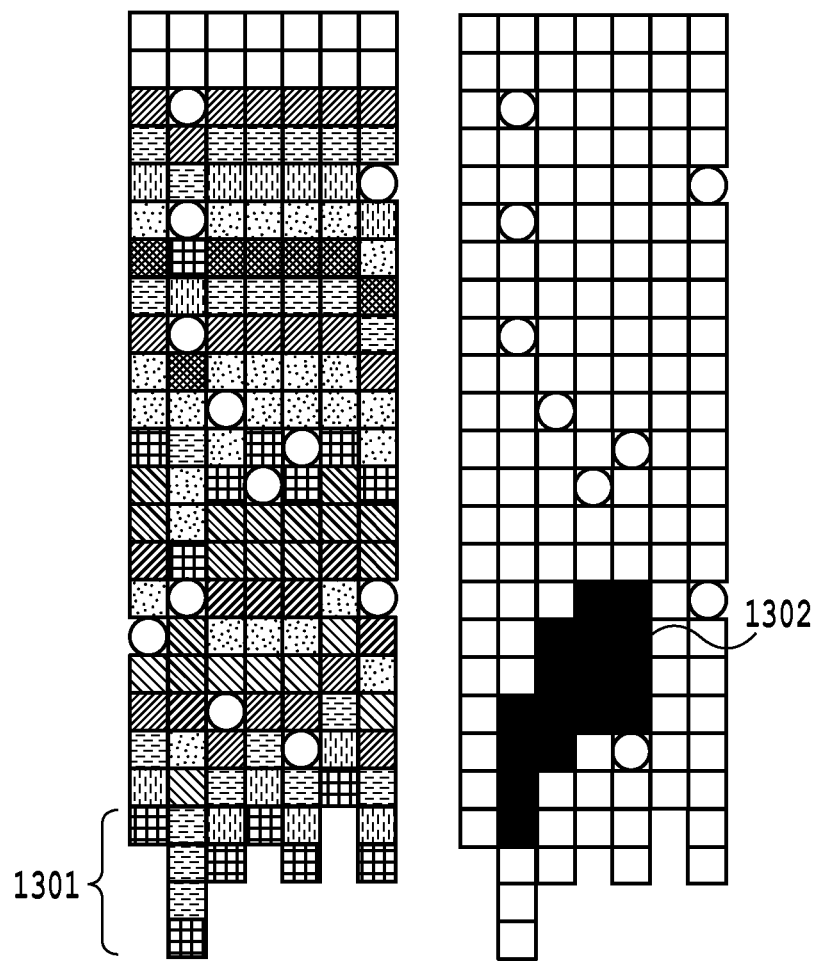
FIG. 13 illustrates an example of the random interpolation of pixels on the entire face an image in the prior art.

FIG. 12 illustrates an example of the result of the above-described delay processing. The reference numeral 1201 denotes multibeam by laser emitted in a stripe-like form. The reference numeral 1202 denotes a position of an original transition area when the delay processing according to this embodiment is not performed. The reference numeral 1203 denotes the delay processing results in dislocated starting positions of transition areas.

As described above, according to the method of Embodiment 5, when a multibeam laser light source is used in a printing mechanism, transition areas can be always within lines in a stripe-like form that are simultaneously scanned. Thus, pixels can thereamong have a more stable interval than in the case of Embodiment 1.

Embodiment 6

In an image printing apparatus based on the electrophotographic method, a different may be caused between a case where toners are collectively fixed and a case where toners in divided amounts are fixed a plurality of times. This difference is caused by a difference in the mixing degree of pigments of the respective colors. To prevent this, a plurality of fixing mode is used for a case where a spot color such as a transparent color. As described above, such an image printing apparatus exists that includes a printing mechanism for performing a plurality of printings and fixings to the same surface of the paper for the purpose of the protection of the front side, the smoothing of the background, or a special effect for example.

In the image printing apparatus having the printing mechanism as described above, a different size is undesirably caused between an image printed and fixed by the first drawing and scanning and images printed and fixed by drawings and scannings after the drawing and scanning. Even in such a case, the methods described in Embodiment 1 or Embodiment 3 can provide a processing for correcting the image size while minimizing the disadvantage involved with the both-sides printing.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-115333, filed May 19, 2010, which is hereby incorporated by reference herein in its entirety.

What is claimed is:

1. An image printing apparatus, comprising:
a printing unit that can print images on both sides of a recording medium; and
an image correction unit for correcting a size of an image to be printed on a back side of the recording medium, wherein:
the image correction unit corrects the sizes of the images by performing at least one of a pixel insertion and thinning processing using a random number to a plurality of transition areas composed of pixel columns that continue in a sub scanning direction of the printing unit,
wherein each of the plurality of transition areas is spaced apart by a predetermined interval, and
wherein the random number is used to diffuse coordinates to be subjected to the pixel insertion and thinning processing.

2. The image printing apparatus according to claim 1, wherein:
the image correction unit has:
a correction coefficient setting unit for setting a correction coefficient for defining an interval among the plurality of transition areas; and
a transition area setting unit for setting the number of pixel columns constituting the transition areas.

3. The image printing apparatus according to claim 2, wherein:
the image printing apparatus further includes an extension and shrink rate setting unit for setting an extension and shrink rate of the recording medium due to printing, and
the correction coefficient setting unit calculates and sets the correction coefficient depending on the extension and shrink rate set by the extension and shrink rate setting unit.

4. The image printing apparatus according to claim 2, wherein:
the image printing apparatus further includes a measurement unit for measuring the time required for the printing on a front side of the recording medium and the time required for the printing on a back side of the recording medium, and
the correction coefficient setting unit uses the time measured by the measurement unit to calculate and set the correction coefficient.

5. An image printing apparatus, comprising:
a printing unit for printing an image on a recording medium by superimposing N drawings and scannings, where $N \geq 2$ is established, and N image correction units for correcting sizes of images printed on the recording medium in drawings and scannings after the second drawing and scanning,
wherein:
the image correction unit corrects the size of the image by performing at least one of a pixel insertion and thinning processing using a random number to a plurality of transition areas composed of pixel columns continuing in a sub scanning direction of the printing unit,
wherein each of the plurality of transition areas is spaced apart by a predetermined interval, and
wherein the random number is used to diffuse coordinates to be subjected to the pixel insertion and thinning processing.

6. The image printing apparatus according to claim 5, wherein: the image correction unit includes a unit for providing the transition areas at different position depending on the respective drawings and scannings.

7. The image printing apparatus according to claim 1, wherein:
the printing unit can print a color image on a recording medium by drawings and scannings of the respective colors using a plurality of color pigments and is provided for each color, and
the image correction unit includes a unit that is provided for each color and that provides transition areas at different positions in the drawings and scannings of the respective colors.

8. The image printing apparatus according to claim 1, wherein:
the printing unit includes a multibeam laser light source from which a plurality of beams can be simultaneously emitted for scanning, and
the image correction unit includes a unit for adjusting a starting position of the transition area so that the transition area is within the width of the multibeam.

9. An image printing method in an image printing apparatus including a printing unit that can print images on both sides of a recording medium, the method comprising the step of:
correcting the size of the image to be printed on a back side of the recording medium, wherein the size of the image is corrected by performing at least one of a pixel insertion and thinning processing using a random number to a plurality of transition areas composed of pixel columns that continue in a sub scanning direction of the printing unit,
wherein each of the plurality of transition areas is spaced apart by a predetermined interval, and
wherein the random number is used to diffuse coordinates to be subjected to the pixel insertion and thinning processing.

10. A non-transitory computer-readable storage medium having computer-executable instructions for performing an image printing method in an image printing apparatus including a printing unit that can print images on both sides of a recording medium, the method comprising the step of:
correcting the size of the image to be printed on a back side of the recording medium, wherein the size of the image is corrected by performing at least one of a pixel insertion and thinning processing using a random number to a plurality of transition areas composed of pixel columns that continue in a sub scanning direction of the printing unit,
wherein each of the plurality of transition areas is spaced apart by a predetermined interval, and
wherein the random number is used to diffuse coordinates to be subjected to the pixel insertion and thinning processing.

* * * * *